US012146413B1

(12) United States Patent
Heeter et al.

(10) Patent No.: US 12,146,413 B1
(45) Date of Patent: Nov. 19, 2024

(54) CIRCUMFERENTIALLY VARIABLE FLOW CONTROL IN FAN OUTLET GUIDE VANE ASSEMBLIES FOR DISTORTION MANAGEMENT AND STALL MARGIN IN GAS TURBINE ENGINES

(71) Applicant: Rolls-Royce North American Technologies Inc., Indianapolis, IN (US)

(72) Inventors: Robert W. Heeter, Indianapolis, IN (US); William B. Bryan, Indianapolis, IN (US); Daniel E. Molnar, Jr., Indianapolis, IN (US); Gregory J. Hebert, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/537,071

(22) Filed: Dec. 12, 2023

(51) Int. Cl.
*F01D 17/10* (2006.01)
*F01D 17/16* (2006.01)

(52) U.S. Cl.
CPC ......... *F01D 17/105* (2013.01); *F01D 17/162* (2013.01); *F05D 2220/32* (2013.01); *F05D 2230/60* (2013.01); *F05D 2240/128* (2013.01); *F05D 2260/606* (2013.01)

(58) Field of Classification Search
CPC .. F01D 17/105; F01D 17/162; F05D 2220/32; F05D 2230/60; F05D 2240/128; F05D 2260/606
See application file for complete search history.

(56) References Cited

U.S. PATENT DOCUMENTS

| | | | | |
|---|---|---|---|---|
| 3,572,960 | A * | 3/1971 | McBride | F04D 29/684 415/209.1 |
| 3,735,593 | A * | 5/1973 | Howell | F04D 29/324 415/115 |
| 4,199,295 | A * | 4/1980 | Raffy | F02C 7/045 415/115 |
| 5,308,225 | A | 5/1994 | Koff et al. | |
| 5,474,417 | A | 12/1995 | Privett et al. | |
| 6,546,734 | B2 * | 4/2003 | Antoine | F02C 7/045 415/119 |
| 6,585,479 | B2 | 7/2003 | Torrance | |
| 7,077,623 | B2 | 7/2006 | Guemmer | |
| 7,967,556 | B2 | 6/2011 | Guemmer | |
| 8,043,046 | B2 | 10/2011 | Guemmer | |
| 8,152,444 | B2 | 4/2012 | Guemmer | |
| 8,152,445 | B2 | 4/2012 | Guemmer | |
| 8,152,467 | B2 | 4/2012 | Guemmer | |
| 8,182,209 | B2 | 5/2012 | Brault et al. | |
| 8,192,148 | B2 | 6/2012 | Guemmer | |
| 8,262,340 | B2 | 9/2012 | Guemmer | |
| 8,403,630 | B2 | 3/2013 | Guemmer | |

(Continued)

*Primary Examiner* — Jesse S Bogue
(74) *Attorney, Agent, or Firm* — Barnes & Thornburg LLP

(57) ABSTRACT

A fan duct assembly includes a bypass duct, an outlet guide vane assembly, and a flow control system. The bypass duct has an outer wall and an inner wall that define a gas path for bypass air therebetween. The outlet guide vane assembly is coupled with the bypass duct and includes a plurality of vanes. The flow control system is configured to direct selectively a portion of the bypass air flowing through the gas path radially into each of the plurality of vanes.

20 Claims, 9 Drawing Sheets

(56) References Cited

U.S. PATENT DOCUMENTS

| | | | |
|---|---|---|---|
| 10,259,565 | B2 | 4/2019 | Ramakrishnan et al. |
| 10,794,281 | B2 | 10/2020 | Nestico et al. |
| 11,073,090 | B2 | 7/2021 | Nestico et al. |
| 11,732,612 | B2 | 8/2023 | Nestico et al. |
| 2017/0218842 | A1 | 8/2017 | Nestico et al. |

* cited by examiner

CIRCUMFERENTIALLY VARIABLE FLOW CONTROL IN FAN OUTLET GUIDE VANE ASSEMBLIES FOR DISTORTION MANAGEMENT AND STALL MARGIN IN GAS TURBINE ENGINES

STATEMENT REGARDING FEDERALLY SPONSORED RESEARCH OR DEVELOPMENT

Embodiments of the present disclosure were made with government support under Contract No. FA8650-19-F-2078. The government may have certain rights.

FIELD OF THE DISCLOSURE

The present disclosure relates generally to gas turbine engines, and more specifically to fan duct assemblies of gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines also typically include a fan assembly positioned within an inlet duct of the gas turbine engine. The fan assembly includes rotating blades that force air into the compressor section of the engine, as well as potentially providing additional thrust via forcing air around the engine core through bypass ducts. Typical fan assemblies further include outlet guide vanes located downstream of the rotating blades to reorient the forced air produced by the rotating blades. Some fan assemblies may experience various operability issues due to factors such as variations in the intake airflow and pressure fluctuations within the inlet and the bypass duct.

SUMMARY

The present disclosure may comprise one or more of the following features and combinations thereof.

A fan duct assembly adapted for use with a gas turbine engine may comprise a bypass duct, a fan, an outlet guide vane assembly, and a circumferentially variable flow control system. The bypass duct may be arranged circumferentially around a central axis. The bypass duct may have an outer wall that defines a radially outer boundary of a gas path of bypass air conducted through the fan duct assembly and an inner wall that defines a radially inner boundary of the gas path. The fan may comprise a plurality of fan blades that extend radially outward relative to the central axis and configured to rotate about the central axis to force the bypass air through the gas path. The outlet guide vane assembly may be coupled with the bypass duct axially downstream of the fan. The outlet guide vane assembly may have a plurality of vanes configured to adjust a direction of the bypass air received from the plurality of fan blades. The plurality of vanes may include a first plurality of vanes and a second plurality of vanes. The first plurality of vanes may extend radially between the inner wall and the outer wall of the bypass duct. The second plurality of vanes may be circumferentially spaced apart from the first plurality of vanes and may extend radially between the inner wall and the outer wall of the bypass duct. The circumferentially variable flow control system may be configured to direct selectively a portion of the bypass air flowing through the gas path at a location aft of the plurality of vanes radially into each of the first plurality of vanes and each of the second plurality of vanes to minimize stall at the plurality of vanes.

In some embodiments, in a first mode, the circumferentially variable flow control system may direct the portion of the bypass air into each of the first plurality of vanes without directing the portion of the bypass air into each of the second plurality of vanes. In a second mode, the circumferentially variable flow control system may direct the portion of the bypass air radially into each of the second plurality of vanes without directing the portion of the bypass air into each of the first plurality of vanes. Each of the plurality of vanes may be formed to include an injection passage extending radially therethrough and outlet holes in fluid communication with the injection passage and the gas path. The injection passage of each of the plurality of vanes may receive the portion of the bypass air therein and the portion of the bypass air may exit the injection passage through the outlet holes to return to the gas path. The circumferentially variable flow control system may include a controller that detects a pressure at each of the plurality of vanes and may operate in the first mode or the second mode based on the pressure detected at each of the plurality of vanes.

In some embodiments, the circumferentially variable flow control system may include a first flow line that fluidly connects the gas path with each of the first plurality of vanes and a second flow line that fluidly connects the gas path with each of the second plurality of vanes. The first flow line may include a first conduit and a first valve. The first conduit may have an inlet port in fluid communication with the gas path and a plurality of outlet ports each in fluid communication with a corresponding one of the first plurality of vanes. The first valve may be coupled with the first conduit and may be configured to selectively open and close to allow and block the portion of the bypass air through the first conduit to the first plurality of vanes. The second flow line may include a second conduit and a second valve. The second conduit may have an inlet port in fluid communication with the gas path and a plurality of outlet ports each in fluid communication with a corresponding one of the second plurality of vanes. The second valve may be coupled with the second conduit and may be configured to selectively open and close to allow and block the portion of the bypass air through the second conduit to the second plurality of vanes.

In some embodiments, each of the first plurality of vanes may be formed to include an injection passage extending radially therethrough and outlet holes in fluid communication with the injection passage and the gas path. The injection passage of each of the first plurality of vanes may be fluidly connected with a corresponding one of the plurality of outlet ports such that the portion of the bypass air flows through the corresponding one of the plurality of outlet ports, into the injection passage, and out of the injection passage through the outlet holes to return to the gas path. The first flow line may include a pump coupled with the first conduit upstream of the plurality of outlet ports. The pump may be configured to force the portion of the bypass air through the first conduit toward the first plurality of vanes. The circumferentially variable flow control system may include a manifold fluidly connecting the first flow line and the second flow line.

In some embodiments, in a third mode, the circumferentially variable flow control system may direct the portion of the bypass air into each of the first plurality of vanes and into each of the second plurality of vanes. At least one vane included in the second plurality of vanes may be a structural support vane fixed with the outer wall and the inner wall of the bypass duct to transmit force loads from the first plurality of vanes to the bypass duct.

According to another aspect of the present disclosure, a fan duct assembly adapted for use with a gas turbine engine may comprise a bypass duct, an outlet guide vane assembly, and a flow control system. The bypass duct may be arranged circumferentially around a central axis. The bypass duct may have an outer wall that defines a radially outer boundary of a gas path of bypass air conducted through the fan duct assembly and an inner wall that defines a radially inner boundary of the gas path. The outlet guide vane assembly may be coupled with the bypass duct. The outlet guide vane assembly may include a first vane and a second vane. The first vane may extend radially between the inner wall and the outer wall of the bypass duct. The second vane may be circumferentially spaced apart from the first vane and may extend radially between the inner wall and the outer wall of the bypass duct. The flow control system may be configured to direct selectively a portion of the bypass air flowing through the gas path into the first vane and the second vane.

In some embodiments, in a first mode, the flow control system may direct the portion of the bypass air into the first vane without directing the portion of the bypass air into the second vane. In a second mode, the flow control system may direct the portion of the bypass air into the second vane without directing the portion of the bypass air into the first vane. The first vane and the second vane may each be formed to include an injection passage extending radially therethrough and outlet holes in fluid communication with the injection passage and the gas path. The injection passage of each of the first vane and the second vane may receive the portion of the bypass air therein and the portion of the bypass air may exit the injection passage through the outlet holes to return to the gas path.

In some embodiments, the flow control system may include a first flow line that fluidly connects the gas path with the injection passage formed in the first vane and a second flow line that fluidly connects the gas path with injection passage formed in the second vane. The first flow line may include a first conduit and a first valve. The first conduit may have a first port in fluid communication with the gas path and a second port in fluid communication with the first vane. The first valve may be coupled with the first conduit and configured to selectively open and close to allow and block the portion of the bypass air through the first conduit.

In some embodiments, the first conduit and the first valve may be located radially outward of the outer wall such that the portion of the bypass air flowing through the first conduit is not exposed to an outer radial surface of the outer wall of the bypass duct. The first conduit and the first valve may be located radially inward of the inner wall of the bypass duct. The first flow line may include a pump coupled with the first conduit and configured to force the portion of the bypass air axially forward through the first conduit toward the first vane. The first flow line may include a pump coupled with the first conduit and configured to pull the portion of the bypass air through outlet holes formed in the first vane so that the portion of the bypass air flows axially aft through the first conduit.

A method may comprise providing a bypass duct that extends circumferentially around a central axis. The bypass duct may have an outer wall that defines a radially outer boundary of a gas path and an inner wall that defines a radially inner boundary of the gas path. The method may include coupling a first vane of an outlet guide vane assembly with the bypass duct. The method may include coupling a second vane of the outlet guide vane assembly with the bypass duct circumferentially spaced apart from the first vane. The method may include flowing bypass air through the gas path of the bypass duct. The method may include, in response to a first signal, opening a first valve, closing a second valve, and directing a portion of the bypass air flowing through the bypass duct into the first vane such that the portion of the bypass air is not directed toward the second vane.

In some embodiments, the method may include, in response to a second signal, opening the second valve, closing the first valve, and directing the portion of the bypass air into the second vane such that the portion of the bypass air is not directed toward the first vane. The method may include, in response to the first signal, directing the portion of the bypass air radially outward through the outer wall of the bypass duct, directing the portion of the bypass air axially forward through a first conduit, and directing the portion of the bypass air radially inward through an outlet port into the first vane.

These and other features of the present disclosure will become more apparent from the following description of the illustrative embodiments.

DETAILED DESCRIPTION

Figure 1:
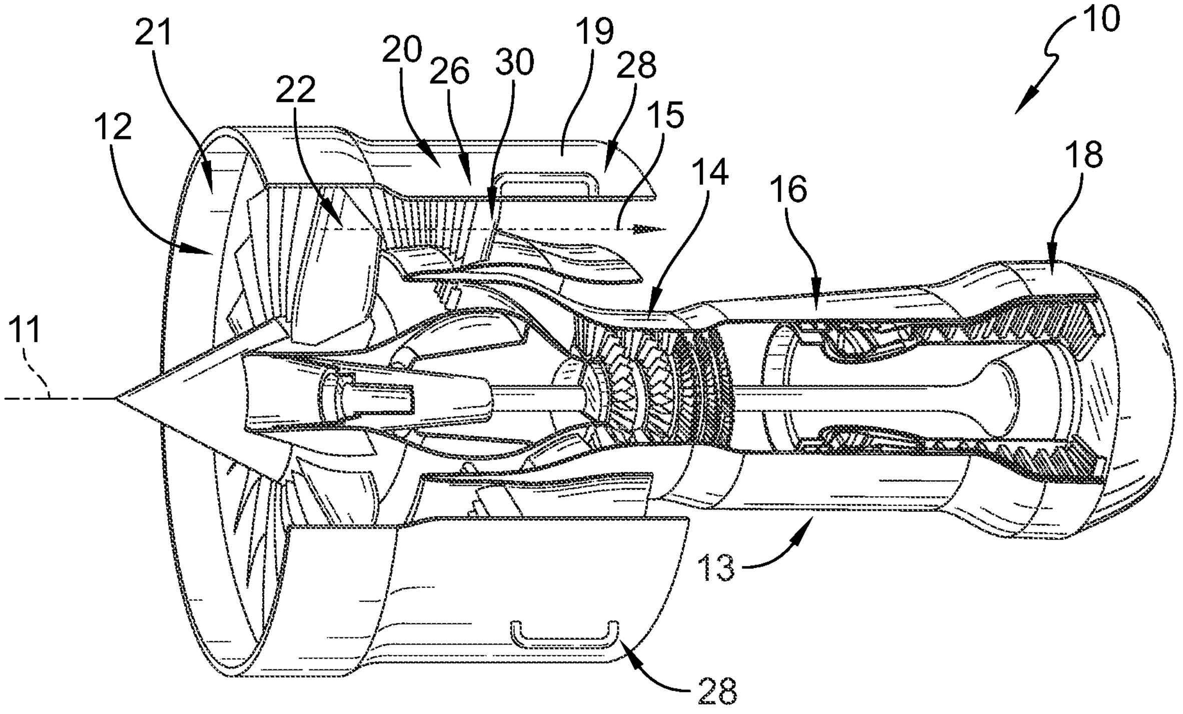
FIG. 1 is a cutaway view of a gas turbine engine that includes a fan duct assembly having a bypass duct arranged circumferentially around a central axis that defines a gas path for bypass air, a fan including fan blades that extend radially outward relative to the central axis, an outlet guide vane assembly located in the bypass duct downstream of the fan blades, and a circumferentially variable flow control system that extends through an outer wall of the bypass duct and is configured to direct selectively a portion of the bypass air into a first plurality of vanes and a second plurality of vanes included in the outlet guide vane assembly to minimize stall at the vanes.

For the purposes of promoting an understanding of the principles of the disclosure, reference will now be made to a number of illustrative embodiments illustrated in the drawings and specific language will be used to describe the same.

An illustrative gas turbine engine 10 includes a fan duct assembly 12 and an engine core 13 having a compressor 14, a combustor 16, and a turbine 18 as shown in FIG. 1. The fan duct assembly 12 is driven by the turbine 18 and provides thrust for propelling an air vehicle by forcing bypass air 15 through a bypass duct 20 that circumferentially surrounds the engine core 13. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan duct assembly 12.

Figure 2:
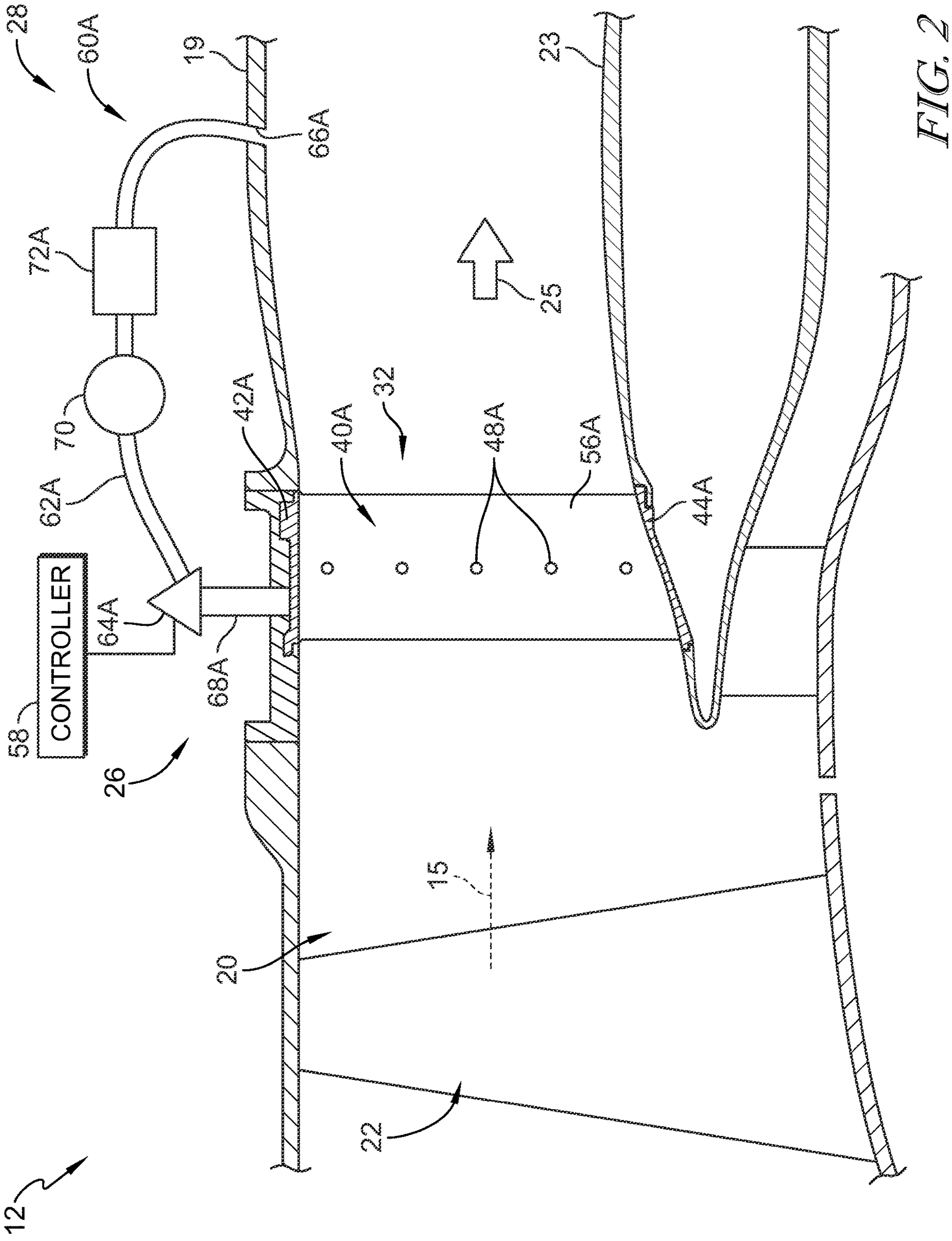
FIG. 2 is a diagrammatic cross-sectional view of the fan duct assembly of FIG. 1, showing that a first vane of the first plurality of vanes extends radially between an inner wall of the bypass duct and the outer wall of the bypass duct, and further showing that the circumferentially variable flow control system includes a first flow line that fluidly connects the gas path with the first vane, the first flow line including a first conduit and a first valve coupled with the first conduit to selectively open and close to allow and block the portion of the bypass air from flowing through the first conduit and into the first vane.

The fan duct assembly 12 includes a fan 21 having a plurality of fan blades 22 that extend radially outward relative to the central axis 11 as shown in FIGS. 1 and 2. The fan blades 22 rotate about the central axis 11 to direct at least a portion of the air flowing over the fan blades 22, the bypass air 15, through the bypass duct 20 such that the bypass air 15 bypasses the engine core 13 and provides thrust for the gas turbine engine 10. The bypass duct 20 includes an outer wall 19 and an inner wall 23 as shown in FIG. 2. The outer wall 19 defines a radially outer boundary of a gas path 25 for the bypass air 15 conducted through the fan duct assembly 12, and the inner wall 23 defines a radially inner boundary of the gas path 25.

The fan duct assembly 12 further includes an outlet guide vane assembly 26 and a circumferentially variable flow control system 28 as shown in FIGS. 1 and 2. The outlet guide vane assembly 26 is coupled with the bypass duct 20 axially downstream of the plurality of fan blades 22. The outlet guide vane assembly 26 includes a plurality of vanes 30 configured to adjust a direction of the bypass air 15 received from the plurality of fan blades 22. The circumferentially variable flow control system 28 is configured to direct selectively a portion of the bypass air 15 flowing through the gas path 25 at a location aft of the outlet guide vane assembly 26 radially into each of the plurality of vanes 30 to minimize stall at the plurality of vanes 30 as suggested in FIG. 2.

The plurality of vanes 30 of the outlet guide vane assembly 26 is illustratively grouped into sections. Of the sections, a first plurality of vanes 32, a second plurality of vanes 34, and a third plurality of vanes 36 are discussed in detail below and shown in FIGS. 2, 3, and 5. Though the outlet guide vane assembly 26 is shown and described as having three pluralities of vanes 32, 34, 36, the outlet guide vane assembly 26 includes additional pluralities of vanes so that the outlet guide vane assembly 26 extends entirely circumferentially about the central axis 11 as suggested in FIG. 1. In one example, for an outlet guide vane assembly 26 that includes sixty vanes, the vanes may be grouped into ten sections, each section having six vanes.

The first plurality of vanes 32, the second plurality of vanes 34, and the third plurality of vanes 36 are representative of other adjacent plurality of vanes included in the outlet guide vane assembly 26. The circumferentially variable flow control system 28 is configured to direct selectively the portion of the bypass air 15 to the vanes of one of the plurality of vanes 32, 34, 36, without directing the portion of the bypass air 15 to the vanes of the other of the plurality of vanes 32, 34, 36 (though portions of the bypass air 15 may also be directed selectively and simultaneously to any one or more of the other plurality of vanes 32, 34, 36).

Some gas turbine engine applications may induce air flow distortion in the fan duct assembly in the form of pressure gradients and swirl. Air flow distortion may be induced by different crosswind and flight orientation profiles across the fan 21. A fan duct assembly may experience varying level of pressure and swirl magnitudes at different circumferential sections. The varying level of pressure and swirl magnitude may be difficult to manage for stall or aeromechanical behavior. According to the present disclosure, directing the portion of the bypass air 15 into specific ones of the plurality of vanes 32, 34, 36 (thus, non-uniformly around a circumference of the outlet guide vane assembly 26) via the circumferentially variable flow control system 28 allows the fan duct assembly 12 to adapt to flow distortions experienced at the different circumferential sections of plurality of vanes 32, 34, 36. Likewise, the circumferentially variable flow control system 28 overcomes stall at the plurality of vanes 32, 34, 36 that the portion of the bypass air 15 is directed toward without inducing choke at other plurality of vanes 32, 34, 36.

Some outlet guide vanes may be mechanically adjustable such that a physical geometry or an angle of attack of the vane is altered. However, mechanically adjusting structural outlet guide vanes may not be feasible. Utilizing the bypass air flow as described in the present disclosure helps to minimize losses at structural outlet guide vanes where other common methods of minimizing losses may not be available. It should be noted that the circumferentially variable flow control system 28 may be used with other mechanical adjustment systems. Likewise, the circumferentially variable flow control system 28 may be used with non-structural outlet guide vanes as it may be challenging to fit mechanical adjustment systems in some bypass ducts.

Turning back to the plurality of vanes 30 of the outlet guide vane assembly 26, the first plurality of vanes 32 extend radially between the inner wall 23 and the outer wall 19 of the bypass duct 20 as shown in FIG. 2. The second plurality of vanes 34 are circumferentially spaced apart from the first plurality of vanes 32 and extend radially between the inner wall 23 and the outer wall 19 of the bypass duct 20 as suggested in the diagrammatic views of FIGS. 3 and 5. The third plurality of vanes 36 are circumferentially spaced apart from the second plurality of vanes 34 as suggested in FIG. 3. In some embodiments, the plurality of vanes 30 may be cast in metal. In some embodiments, the plurality of vanes 30 may be produced from composite with tubes molded into the structure. In some embodiments, the plurality of vanes 30 may be 3D-printed. The plurality of vanes 32, 34, 36 are shown as being adjacent, but may be any groupings of vanes 30.

Figure 3:
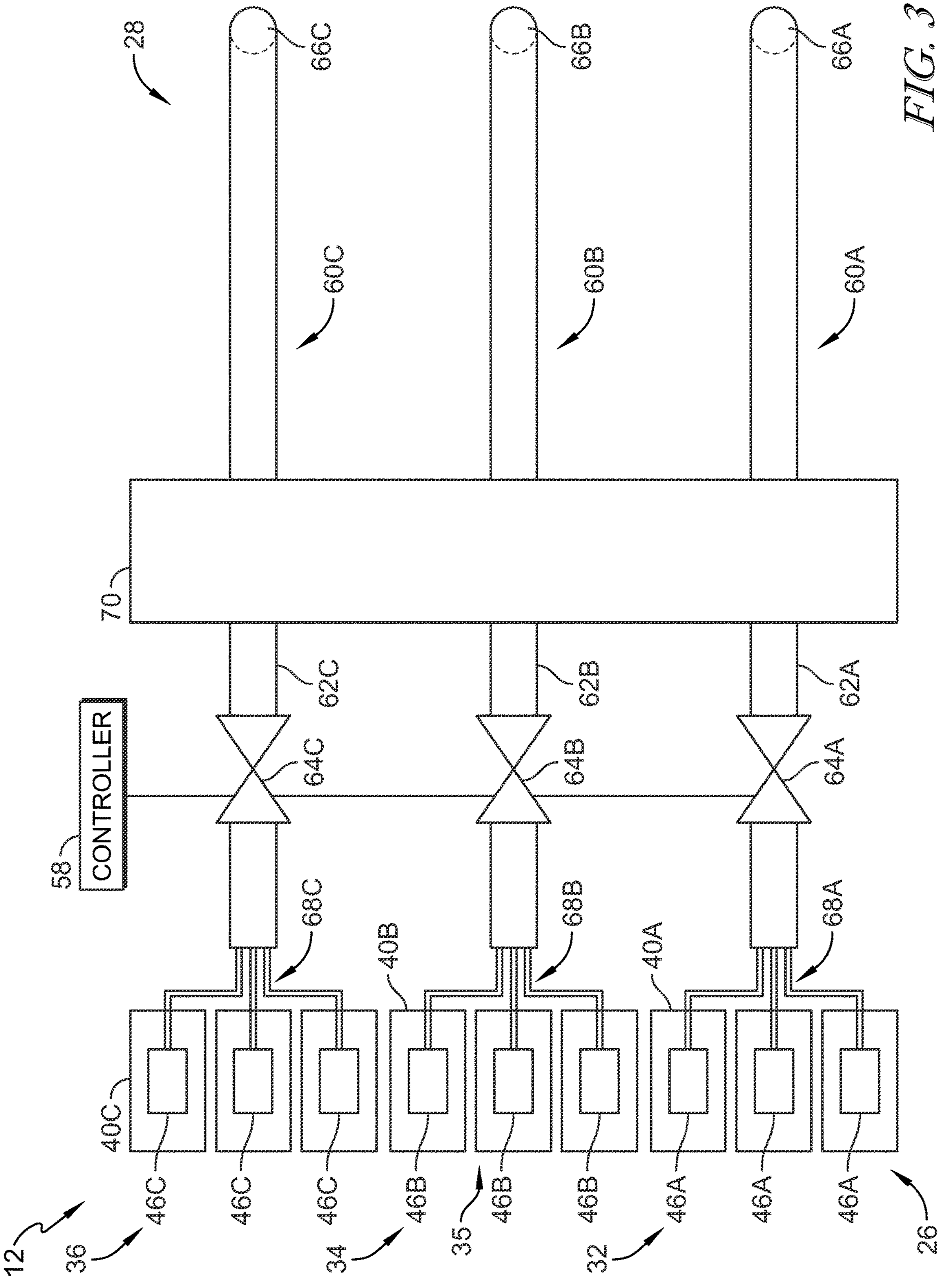
FIG. 3 is a diagrammatic view of a portion of the fan duct assembly of FIG. 1, showing that the circumferentially variable flow control system includes a flow line for each plurality of vanes and the flow lines are circumferentially spaced apart from one another, each flow line includes an inlet port in fluid communication with the gas path and a plurality of outlet ports that are each in fluid communication with a corresponding one of the vanes, and further showing that the circumferentially variable flow control system includes a manifold that fluidly connects each flow line so that the portion of the bypass air from each inlet port combines in the manifold.
Figure 5:
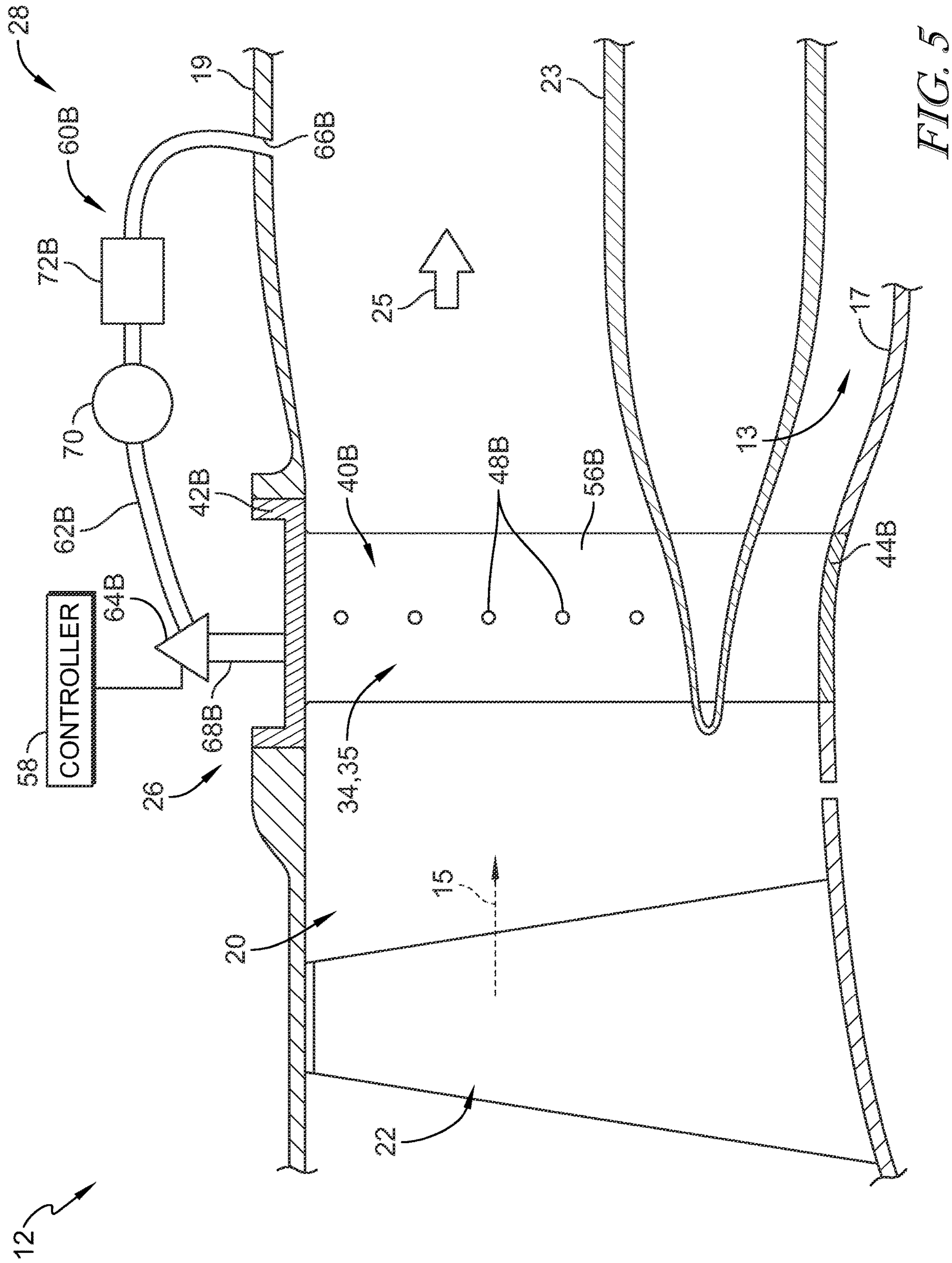
FIG. 5 is a diagrammatic cross-sectional view of the fan duct assembly of FIG. 1, showing a second vane of the second plurality of vanes is fixed with the outer wall and the inner wall of the bypass duct to transmit force loads from the first plurality of vanes to the bypass duct, and further showing that a second flow line fluidly connects the gas path with the second vane, the second flow line including a second conduit and a second valve coupled with the second conduit to selectively open and close to allow and block the portion of the bypass air from flowing through the second conduit and into the second vane.

Each vane of the first plurality of vanes 32, the second plurality of vanes 34, and the third plurality of vanes 36 includes a body 40A, 40B, 40C, a radial outer platform 42A, 42B, and a radial inner platform 44A, 44B as shown in FIGS. 2, 3, and 5. The body 40A, 40B, 40C extends radially between the radial outer platform 42A, 42B and the radial inner platform 44A, 44B.

Figure 4B:
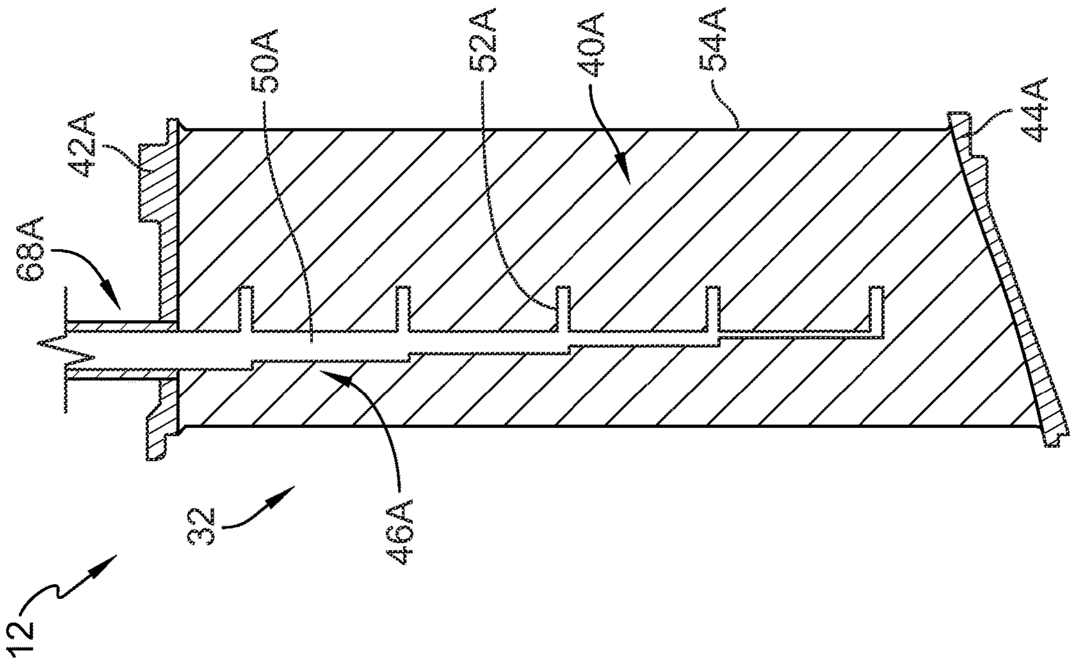
FIG. 4B is a diagrammatic cross-sectional view of the first vane of FIG. 4A, showing that the first vane is formed to include an injection passage extending radially through the first vane, the injection passage is in fluid communication with one of the outlet ports and the outlet holes to conduct the portion of the bypass air from the one of the outlet ports and through the outlet holes back into the gas path to minimize stall at the first vane.
Figure 4A:
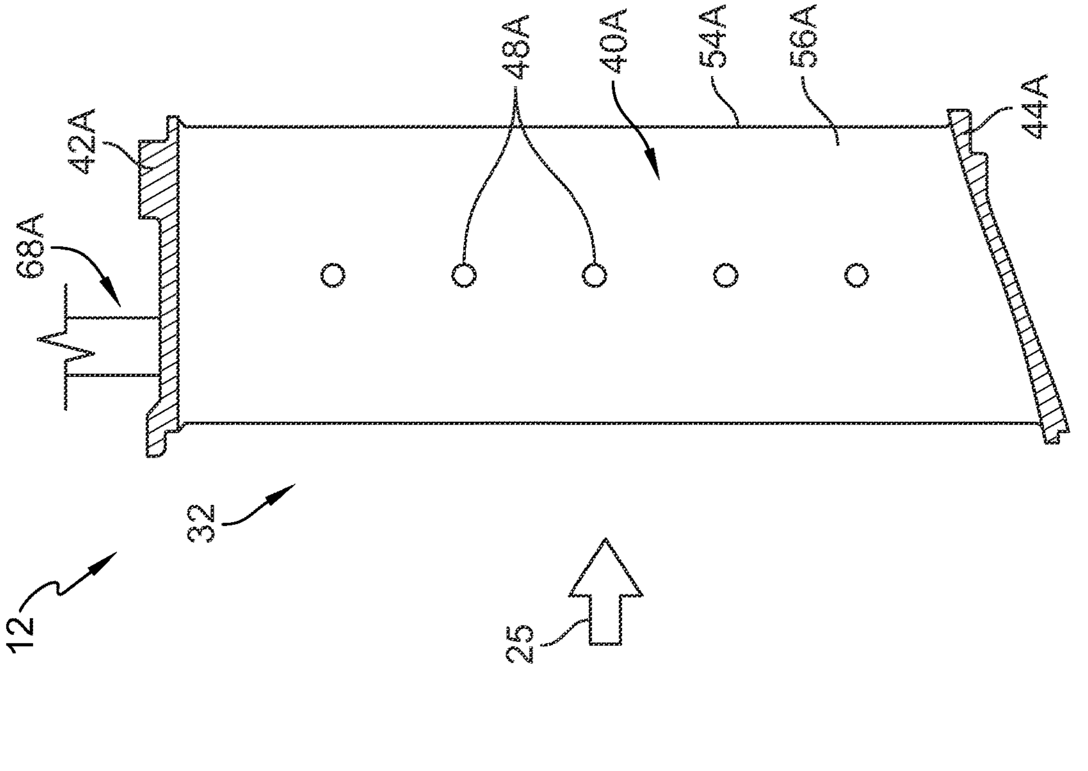
FIG. 4A is an enlarged elevation view of a portion of the fan duct assembly of FIG. 2, showing that the first vane is formed to include outlet holes that are in fluid communication with the gas path so that the portion of the bypass air flows through one of the outlet ports, radially into the first vane, and back into the gas path through the outlet holes.
Figure 6B:
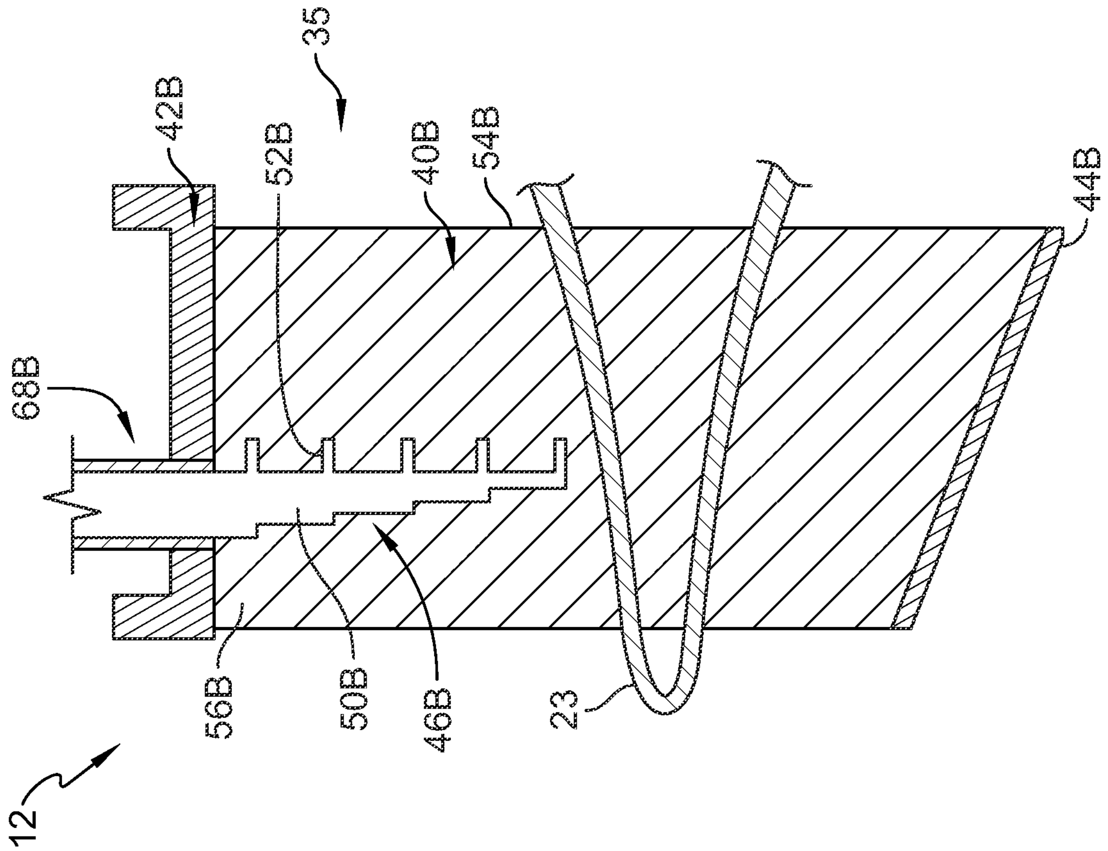
FIG. 6B is a diagrammatic cross-sectional view of the second vane of FIG. 6A, showing that the second vane is formed to include an injection passage extending radially through the second vane, the injection passage in fluid communication with the one of the outlet ports and the outlet holes to conduct the portion of the bypass air from the one of the outlet ports and through the outlet holes to minimize stall at the second vane.
Figure 6A:
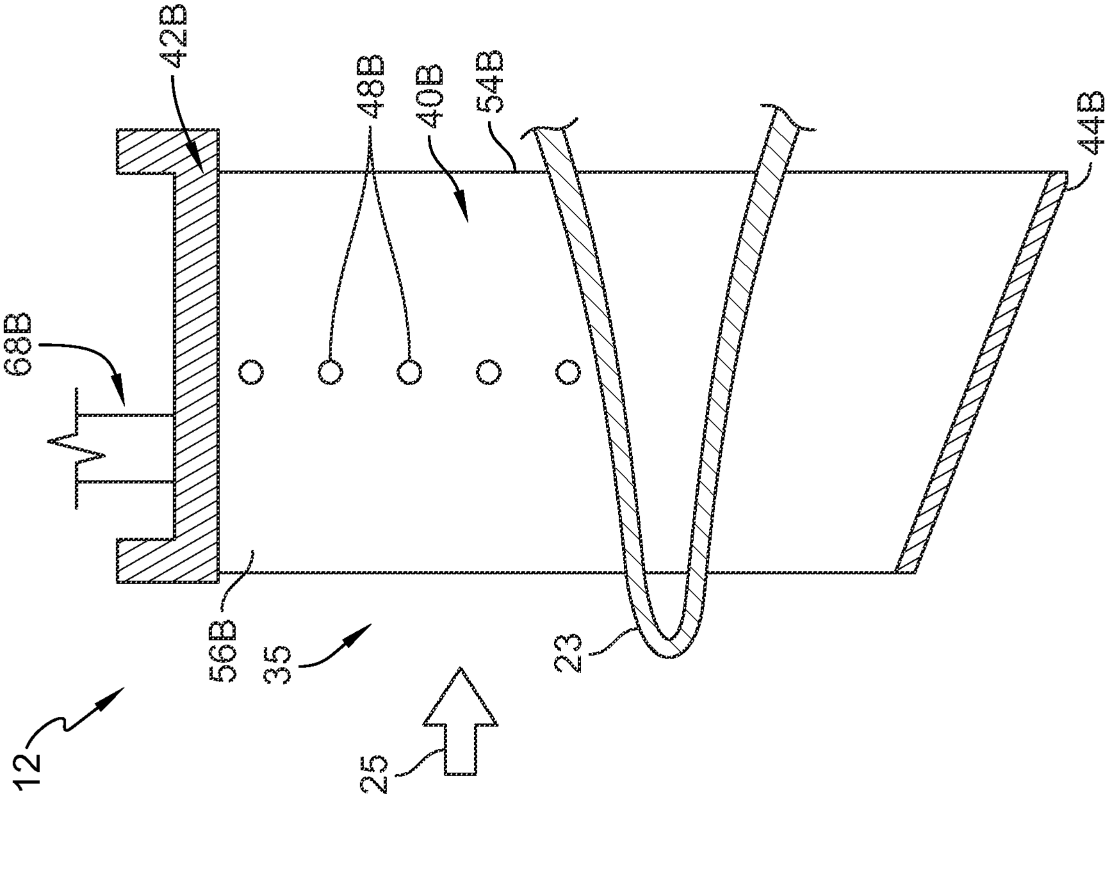
FIG. 6A is an enlarged view of a portion of the fan duct assembly of FIG. 5, showing that the second vane is formed to include outlet holes that are in fluid communication with the gas path so that the portion of the bypass air flows through one of the outlet ports, radially into the second vane, and back into the gas path through the outlet holes.

Each body 40A, 40B, 40C is formed to include an injection passage 46A, 46B, 46C, as shown in FIGS. 3, 4B, and 6B, and outlet holes 48A, 48B, as shown in FIGS. 4A and 6A. The injection passage 46A, 46B, 46C extends radially (i.e., spanwise) into the body 40A, 40B, 40C from the radial outer platform 42A, 42B toward the radial inner platform 44A, 44B. The outlet holes 48A, 48B are in fluid communication with the injection passage 46A, 46B, 46C and the gas path 25.

Illustratively, the injection passage 46A, 46B, 46C includes a radial portion 50A, 50B and a plurality of axial portions 52A, 52B as shown in FIGS. 4B and 6B. The radial portion 50A, 50B extends radially inward into the body 40A, 40B, 40C from the radial outer platform 42A, 42B toward the radial inner platform 44A, 44B. The plurality of axial portions 52A, 52B extend axially aft (i.e., chordwise) from the radial portion 50A, 50B toward a trailing edge 54A, 54B of the body 40A, 40B and circumferentially toward a surface 56A, 56B of the body 40A, 40B. The plurality of axial portions 52A, 52B are radially spaced apart from one another. In some embodiments, the injection passage 46A, 46B, 46C has a decreasing diameter as the injection passage 46A, 46B, 46C extends radially inward toward the radial inner platform 44A, 44B as shown in FIGS. 4B and 6B. In some embodiments, the injection passage 46A, 46B, 46C has a constant diameter as the injection passage 46A, 46B, 46C extends radially inward toward the radial inner platform 44A, 44B. Illustratively, the injection passage 46A, 46B, 46C extends through the body 40A, 40B, 40C near a point of maximum thickness of the body 40A, 40B, 40C, which is near mid-chord.

The outlet holes 48A, 48B extend through the surface 56A, 56B of the body 40A, 40B, 40C to fluidly connect each of the axial portions 52A, 52B of the injection passage 46A, 46B, 46C to the gas path 25 as shown in FIGS. 4A and 6A. Bypass air 15 flowing through the bypass duct 20 may separate from a suction side of the vanes 32, 34, 36. The portion of the bypass air 15 flows through the injection passage 46A, 46B, 46C of the vanes 32, 34, 36 and out of the outlet holes 48A, 48B into the gas path 25. In some examples, the portion of the bypass air 15 flowing out of the outlet holes 48A, 48B maintains flow attachment to the suction side of the vanes 32, 34, 36. Illustratively, a number of outlet holes 48A, 48B is equal to a number of axial portions 52A, 52B. There may be any number of outlet holes 48A, 48B, such as, but not limited to, one, two, three, four, five, or six. The outlet holes 48A, 48B may be any size or shape. The outlet holes 48A, 48B may be arranged anywhere on the vanes 32, 34. For example, the outlet holes 48A, 48B are illustratively located near mid-chord of the vanes 32, 34. In another example, the outlet holes 48A, 48B may be located forward or aft of mid-chord.

The radial outer platform 42A of each of the first plurality of vanes 32 is coupled with the outer wall 19 of the bypass duct 20 as shown in FIG. 2. The radial inner platform 44A of each of the first plurality of vanes 32 is coupled with the inner wall 23 of the bypass duct 20. In some embodiments, the inner wall 23 is integral with the radial inner platform 44A and/or the outer wall 19 is integral with the radial outer platform 42A.

At least one vane 35 included in the second plurality of vanes 34 is a structural support vane 35 as shown in FIG. 5. Other vanes in the second plurality of vanes 34 may be identical to the vanes of the first plurality of vanes 32 as shown in FIG. 2. The structural support vane 35 extends between the outer wall 19 of the bypass duct 20 and the engine core 13. The radial outer platform 42B of the structural support vane 35 is fixed with the outer wall 19 of the bypass duct 20. In some embodiments, the radial outer platform 42B forms a portion of the outer wall 19 of the bypass duct 20 as shown in FIG. 5. In some embodiments, the radial outer platform 42B is integral with the outer wall 19 of the bypass duct 20. The structural support vane 35 is fixed with the inner wall 23 of the bypass duct 20 as shown in FIG. 5. The radial inner platform 44B is fixed with an inner wall 17 of the engine core 13. In some embodiments, the radial inner platform 44B forms a portion of the inner wall 17 of the engine core 13.

The structural support vane 35 is fixed to the outer wall 19 and the inner wall 23 of the bypass duct 20 to transmit force loads from the plurality of vanes 30 that are not structural support vanes to the bypass duct 20. The plurality of vanes 30 may include any number of structural support vanes 35. The injection passage 46B of the structural support vane 35 terminates radially outward of the inner wall 23 of the bypass duct 20 as shown in FIG. 6B. The outlet holes 48B are formed on the body 40B of the structural support vane 35 radially outward of the inner wall 23 of the bypass duct 20.

The circumferentially variable flow control system 28 includes a first flow line 60A, a second flow line 60B, and a third flow line 60C as shown in FIG. 3. Illustratively, the circumferentially variable flow control system 28 includes a flow line for each section of vanes. In some embodiments, the circumferentially variable flow control system 28 is located entirely radially outward of the outer wall 19 of the bypass duct 20. The first flow line 60A fluidly connects the gas path 25 with each of the first plurality of vanes 32. The second flow line 60B fluidly connects the gas path 25 with each of the second plurality of vanes 34. The third flow line 60C fluidly connects the gas path 25 with each of the third plurality of vanes 36.

The first flow line 60A includes a first conduit 62A and a first valve 64A as shown in FIGS. 2 and 3. The first conduit 62A directs the portion of the bypass air 15 out of the gas path 25 and into the injection passage 46A formed in each of the first plurality of vanes 32. The first conduit 62A and the first valve 64A are located radially outward of the outer wall 19 of the bypass duct 20 such that the portion of the bypass air 15 flowing through the first conduit 62A is not exposed to an outer radial surface of the outer wall 19.

The first conduit 62A has an inlet port 66A in fluid communication with the gas path 25 and a plurality of outlet ports 68A as shown in FIG. 3. The inlet port 66A extends through an entirety of the outer wall 19 of the bypass duct 20. The inlet port 66A is located axially aft of the first plurality of vanes 32. In some embodiments, a scoop may be coupled with the inlet port 66A to direct the portion of the bypass air 15 flowing through the gas path 25 into the inlet port 66A. From the inlet port 66A, the first conduit 62A extends radially outward and axially forward as shown in FIG. 2. The plurality of outlet ports 68A extend through the outer wall 19 of the bypass duct 20 and through the radial outer platform 42A of each of the first plurality of vanes 32. Each of the plurality of outlet ports 68A is in fluid communication with a corresponding injection passage 46A of a corresponding first vane 32.

The first valve 64A is coupled with the first conduit 62A upstream of the plurality of outlet ports 68A as shown in FIGS. 2 and 3. The first valve 64A is configured to selectively open and close to allow and block the portion of the bypass air 15 from flowing through the first conduit 62A and into each of the first plurality of vanes 32. The first valve 64A may be any type of valve.

The second flow line 60B includes a second conduit 62B and a second valve 64B as shown in FIGS. 3 and 5. The second conduit 62B directs the portion of the bypass air 15 out of the gas path 25 and into the injection passage 46B formed in each of the second plurality of vanes 34. The second conduit 62B and the second valve 64B are located radially outward of the outer wall 19 of the bypass duct 20 such that the portion of the bypass air 15 flowing through the second conduit 62B is not exposed to the outer radial surface of the outer wall 19.

The second conduit 62B has an inlet port 66B in fluid communication with the gas path 25 and a plurality of outlet ports 68B as shown in FIG. 5. The inlet port 66B extends through an entirety of the outer wall 19 of the bypass duct 20 axially aft of the second plurality of vanes 34. In some embodiments, a scoop may be coupled with the inlet port 66B to direct the portion of the bypass air 15 flowing through the gas path 25 into the inlet port 66B. From the inlet port 66B, the second conduit 62B extends radially outward and axially forward as shown in FIG. 5. The plurality of outlet ports 68B extend through the outer wall 19 of the bypass duct 20 and through the radial outer platform 42B of each of the second plurality of vanes 34. Each of the plurality of outlet ports 68B is in fluid communication with a corresponding injection passage 46B of a corresponding second vane 34.

The second valve 64B is coupled with the second conduit 62B upstream of the plurality of outlet ports 68B shown in FIGS. 3 and 5. The second valve 64B is configured to selectively open and close to allow and block the portion of the bypass air 15 through the second conduit 62B to the second plurality of vanes 34. The second valve 64B may be any type of valve.

The third flow line 60C includes a third conduit 62C and a third valve 64C as shown in FIG. 3. The third conduit 62C directs the portion of the bypass air 15 out of the gas path 25 and into the injection passage 46C formed in each of the third plurality of vanes 36. The third conduit 62C has an inlet port 66C in fluid communication with the gas path 25 and a plurality of outlet ports 68C. Each of the plurality of outlet ports 68C is in fluid communication with a corresponding injection passage 46C of a corresponding third vane 36. The third valve 64C is coupled with the third conduit 62C and is configured to selectively open and close to allow and block the portion of the bypass air 15 through the third conduit 62C to the third plurality of vanes 36.

The circumferentially variable flow control system 28 includes a manifold 70 fluidly connecting the conduits 62A, 62B, 62C of each flow line 60A, 60B, 60C as shown in FIG. 3. In some embodiments, the manifold 70 extends entirely circumferentially around the bypass duct 20. In some embodiments, the manifold 70 is segmented such that the manifold 70 extends at least partway circumferentially around the bypass duct 20. The manifold 70 is located upstream of the valves 64A, 64B, 64C. The portion of the bypass air 15 from each inlet port 66A, 66B, 66C combines in the manifold 70.

The circumferentially variable flow control system 28 includes a controller 58, as shown in FIGS. 2, 3, and 5, configured to direct the portion of the bypass air 15 toward the first, the second, and/or the third plurality of vanes 32, 34, 36 depending on which vanes 32, 34, 36 are at stall risk. The controller 58 operates in different modes by selectively opening and closing the valves 64A, 64B, 64C depending on the experienced or the anticipated stall at a particular section of vanes 32, 34, 36.

In response to a first signal, the controller 58 operates in a first mode in which the first valve 64A is opened and the second and third valves 64B, 64C are closed. In the first mode, the portion of the bypass air 15 located in the manifold 70 is directed into each of the first plurality of vanes 32 without being directed into any other section of vanes 30 (i.e., the second plurality of vanes 34 and the third plurality of vanes 36). In response to a second signal, the controller 58 operates in a second mode in which the second valve 64B is opened and the first and third valves 64A, 64C are closed. In the second mode, the portion of the bypass air 15 located in the manifold 70 is directed into each of the second plurality of vanes 34 without being directed into any other section of vanes 30 (i.e., the first plurality of vanes 32 and the third plurality of vanes 36). In response to a third signal, the controller 58 operates in a third mode in which the third valve 64C is opened and the first and second valves 64A, 64B are closed. In the third mode, the portion of the bypass air 15 located in the manifold 70 is directed into each of the third plurality of vanes 36 without being directed into any other section of vanes 30 (i.e., the first plurality of vanes 32 and the second plurality of vanes 34).

There may be any number of modes that the controller 58 operates in. For example, in some modes, multiple sections of the plurality of vanes 30 may receive the portion of the bypass air 15 (i.e., multiple valves are open). For example, in a fourth mode, the portion of the bypass air 15 may be directed into each of the first plurality of vanes 32 and into each of the second plurality of vanes 34. In some modes, none of the sections of the plurality of vanes 30 may receive the portion of the bypass air 15 (i.e., all the valves are closed). In some modes, all of the sections of the plurality of vanes 30 may receive the portion of the bypass air 15 (i.e., all the valves are open).

In some embodiments, the controller 58 operates in a particular mode based on an operating condition of the gas turbine engine 10, maneuvers of an aircraft having the gas turbine engine 10, sensor input, and combinations of the same. The operating conditions may include at least one of take-off, climb, cruise, descent, and landing of an aircraft having the gas turbine engine 10. The maneuvers may include at least one of banks, turns, or rolls. In each of these operating conditions and/or maneuvers, the plurality of vanes 30 may experience various undesirable operability issues. Based on the operating condition and/or the maneuvers, it may be anticipated that stall will occur at a particular circumferential section of vanes, which determines which mode the controller 58 operates in.

In some embodiments, the controller 58 detects a real-time pressure at each of the plurality of vanes 30 and operates in a particular mode based on the pressure detected at each of the plurality of vanes 30. In some embodiments, hot wire measurements may be used to detect or anticipate stall of the plurality of vanes 30. In such an embodiment, an array of hot film sensors may be fit to each of the plurality of vanes 30. In some embodiments, the array of hot film sensors are used during a test period to collect data regarding the pressure detected during tests simulating operating conditions and/or maneuvers. The data is stored in a memory of the controller 58 for use during operation of the gas turbine engine 10. The stored data and the operating conditions and/or maneuvers are used during operation of the gas turbine engine 10 to operate the valves 64A, 64B, 64C in a particular mode. The stored data and the operating conditions and/or maneuvers may be used to determine the particular mode, instead of real-time measurements via the array of hot film sensors.

In some embodiments, the controller 58 operates in different modes by selectively opening and closing the valves 64A, 64B, 64C depending on sensor input from at least one sensor included in the controller 58. The at least one sensor is configured to measure one of temperature, pressure, air speed, altitude, blade tip timing, blade rotational speed, attitude or aircraft orientation, and acceleration. The at least one sensor is configured to detect distortion, fan stall, and/or other aeromechanical issues. The controller 58 receives a measurement from the at least one sensor or sensors and directs the valves 64A, 64B, 64C to open or close in response to the measurement.

For example, the controller 58 may be configured to direct one or more of the valves 64A, 64B, 64C to close when the measurements from the sensor(s) are within a predetermined threshold. Then, when the measurements from the sensor(s) are outside of the predetermined threshold, the controller 58 may direct one or more of the valves 64A, 64B, 64C to open to direct the portion of the bypass air 15 into the particular section of vanes 32, 34, 36. In some embodiments, the controller 58 is configured to use the measurements from the sensor(s) to anticipate aircraft maneuvers.

The sensor(s) may include one of or a combination of dynamic sensors, static wall pressure sensors, altitude sensors, sensors configured to detect the angle of attack of the plurality of fan blades 22, sensors configured to detect the tip timing of the plurality of fan blades 22, and air speed sensors. In some embodiments, the sensor(s) may be a dynamic pressure transducer. The sensor(s) may also be a sensor configured to measure a rotational speed of the fan blades 22, which could be used along with an additional sensor that is a dynamic pressure transducer. In some embodiments, the sensor(s) may be a sensor configured to measure a rotation speed of another section of the engine 10.

In some embodiments, each of the flow lines 60A, 60B, 60C includes a pump 72A, 72B coupled with the conduit 62A, 62B as shown in FIGS. 2 and 5. The pump 72A, 72B may act as a secondary compressor. The pump 72A, 72B is located upstream of the manifold 70. The pump 72A, 72B is configured to operate in different modes to increase a pressure as necessary to enable sufficient flow of the portion of the bypass air 15. The controller 58 may control a speed, a mode, and/or an on/off operation of the pump 72A, 72B. In some embodiments, the pump 72A, 72B is omitted.

In a first mode, the pump 72A, 72B pulls the portion of the bypass air 15 into the inlet port 66A, 66B and forces the portion of the bypass air 15 through the conduit 62A, 62B toward the manifold 70. In a second mode, the pump 72A, 72B creates a vacuum to pull the portion of the bypass air 15 through the outlet holes 48A, 48B formed in the vanes 32, 34 so that the portion of the bypass air 15 flows in the opposite direction as that in the first mode. The portion of the bypass air 15 flows into the outlet holes 48A, 48B, through one of the plurality of outlet ports 68A, 68B, and through the inlet port 66A, 66B back into the gas path 25. In some embodiments, the pump 72A, 72B is configured to operate in only one mode (i.e., the first mode or the second mode). As an example, if the pump 72A, 72B is configured to operate in only the second mode, the outlet holes 48A, 48B formed in the vanes 32, 34 may be angled forward instead of angled aft.

In some embodiments, the pump 72A is configured to operate in the first mode and the pump 72B is configured to operate in the second mode. In such an embodiment, some of the pumps, such as the pump 72A, of the circumferentially variable flow control system 28 operate in the first mode, and other pumps, such as the pump 72B, operate in the second mode. The different modes of operation (i.e., the pump 72A in the first mode and the pump 72B in the second mode) allows for stall mitigation at some of the vanes, 32, 34 and for choke mitigation at other vanes 32, 34. The different modes of operation may be run simultaneously such that both of the valves 64A, 64B are open (i.e., stall mitigation and choke mitigation occur simultaneously at different vanes 32, 34). In such an embodiment, the manifold 70 may be segmented such that the manifold 70 does not form a full hoop. Using pumps 72A, 72B in different modes in different conduits 62A, 62B allows for stall mitigation and choke mitigation.

Figure 7:
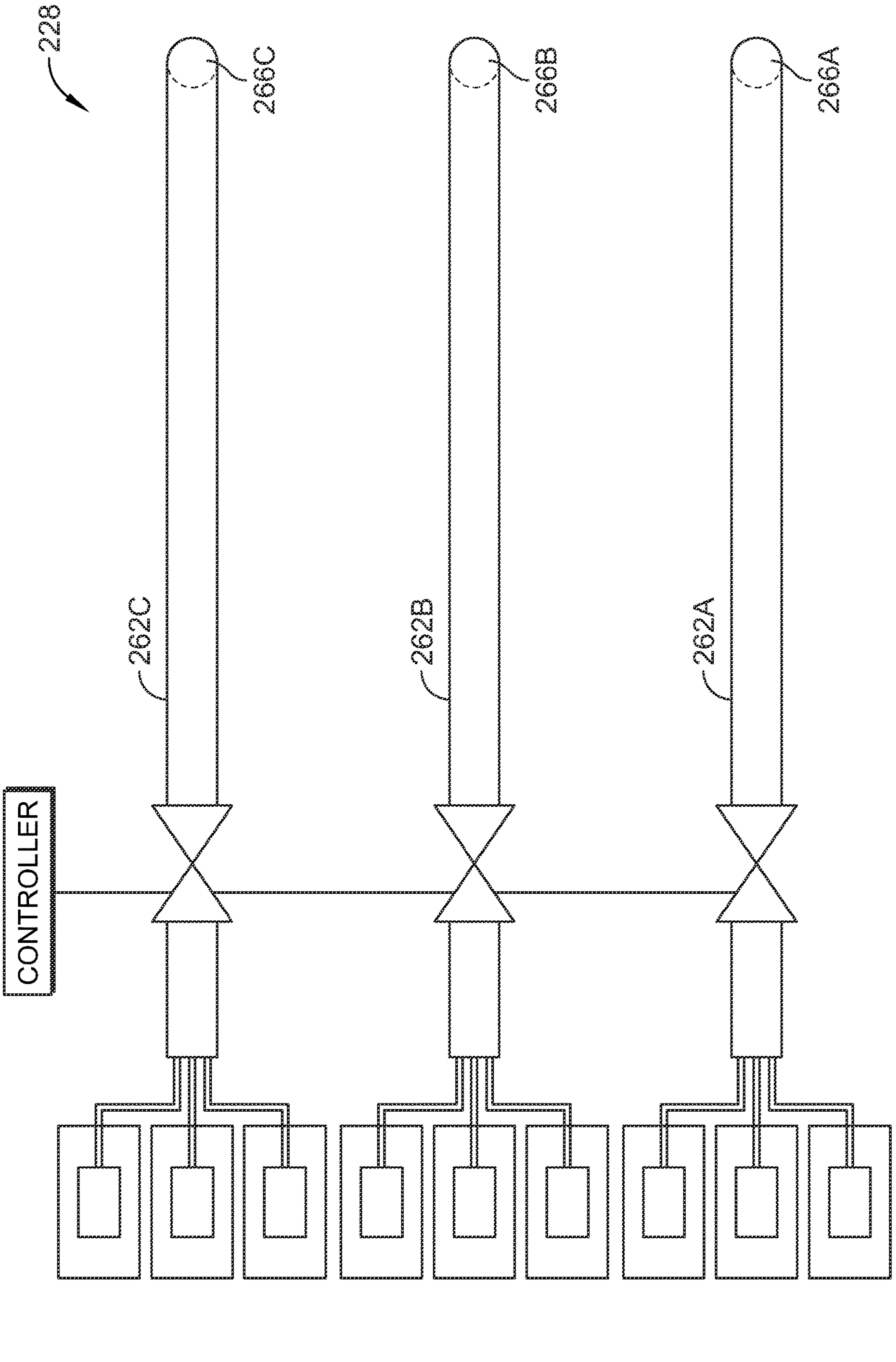
FIG. 7 is a diagrammatic view of a portion of the fan duct assembly of FIG. 1 including another embodiment of a circumferentially variable flow control system, showing that the circumferentially variable flow control system includes a flow line for each plurality of vanes that fluidly connects the plurality of vanes with the gas path and each of the flow lines remains separate from one another so that a portion of bypass air from each inlet port is not combined.

Another embodiment of a circumferentially variable flow control system 228 in accordance with the present disclosure is shown in FIG. 7. The circumferentially variable flow control system 228 is substantially similar to the circumferentially variable flow control system 28 shown in FIGS. 1-6 and described herein. Accordingly, similar reference numbers in the 200 series indicate features that are common between the circumferentially variable flow control system 28 and the circumferentially variable flow control system 228. The description of the circumferentially variable flow control system 28 is incorporated by reference to apply to the circumferentially variable flow control system 228, except in instances when it conflicts with the specific description and the drawings of the circumferentially variable flow control system 228.

As compared to the circumferentially variable flow control system 28, the circumferentially variable flow control system 228 is substantially similar expect that the circumferentially variable flow control system 228 does not include a manifold. Each conduit 262A, 262B, 262C is separate from the other conduits 262A, 262B, 262C so that the portion of the bypass air 15 from each inlet port 266A, 266B, 266C does not combine with the portion of the bypass air 15 from the other inlet ports 266A, 266B, 266C.

Figure 8:
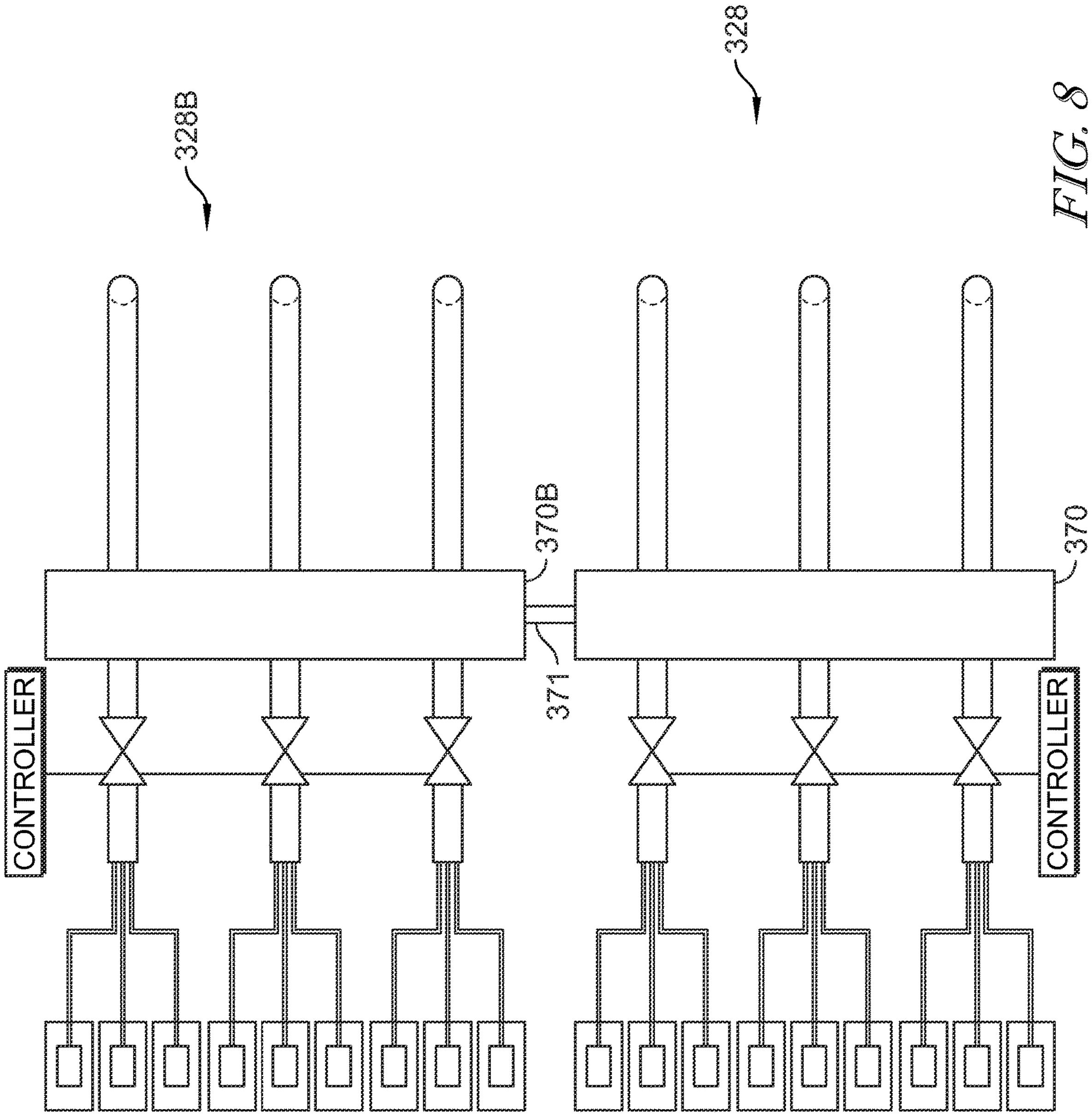
FIG. 8 is a diagrammatic view of a portion of the fan duct assembly of FIG. 1 including another embodiment of a circumferentially variable flow control system, showing that a manifold of the circumferentially variable flow control system is fluidly connected to a manifold of a second circumferentially variable flow control system included in a second gas turbine engine so that the portion of the bypass air from each inlet port of each circumferentially variable flow control system is combined in the manifold.

Another embodiment of a circumferentially variable flow control system 328 in accordance with the present disclosure is shown in FIG. 8. The circumferentially variable flow control system 328 is substantially similar to the circumferentially variable flow control system 28 shown in FIGS. 1-6 and described herein. Accordingly, similar reference numbers in the 300 series indicate features that are common between the circumferentially variable flow control system 28 and the circumferentially variable flow control system 328. The description of the circumferentially variable flow control system 28 is incorporated by reference to apply to the circumferentially variable flow control system 328, except in instances when it conflicts with the specific description and the drawings of the circumferentially variable flow control system 328.

As compared to the circumferentially variable flow control system 28, the circumferentially variable flow control system 328 is substantially similar expect that a manifold 370 of the circumferentially variable flow control system 328 is fluidly connected with a manifold 370B of another circumferentially variable flow control system 328B included in another gas turbine engine as shown in FIG. 8. The circumferentially variable flow control system 328B is identical to the circumferentially variable flow control system 328. The portion of the bypass air included in the manifold 370B of the circumferentially variable flow control system 328B may flow to the manifold 370 to combine with the portion of the bypass air included in the manifold 370 and vice versa. A manifold channel 371 connects the manifold 370 with the manifold 370B.

Figure 9:
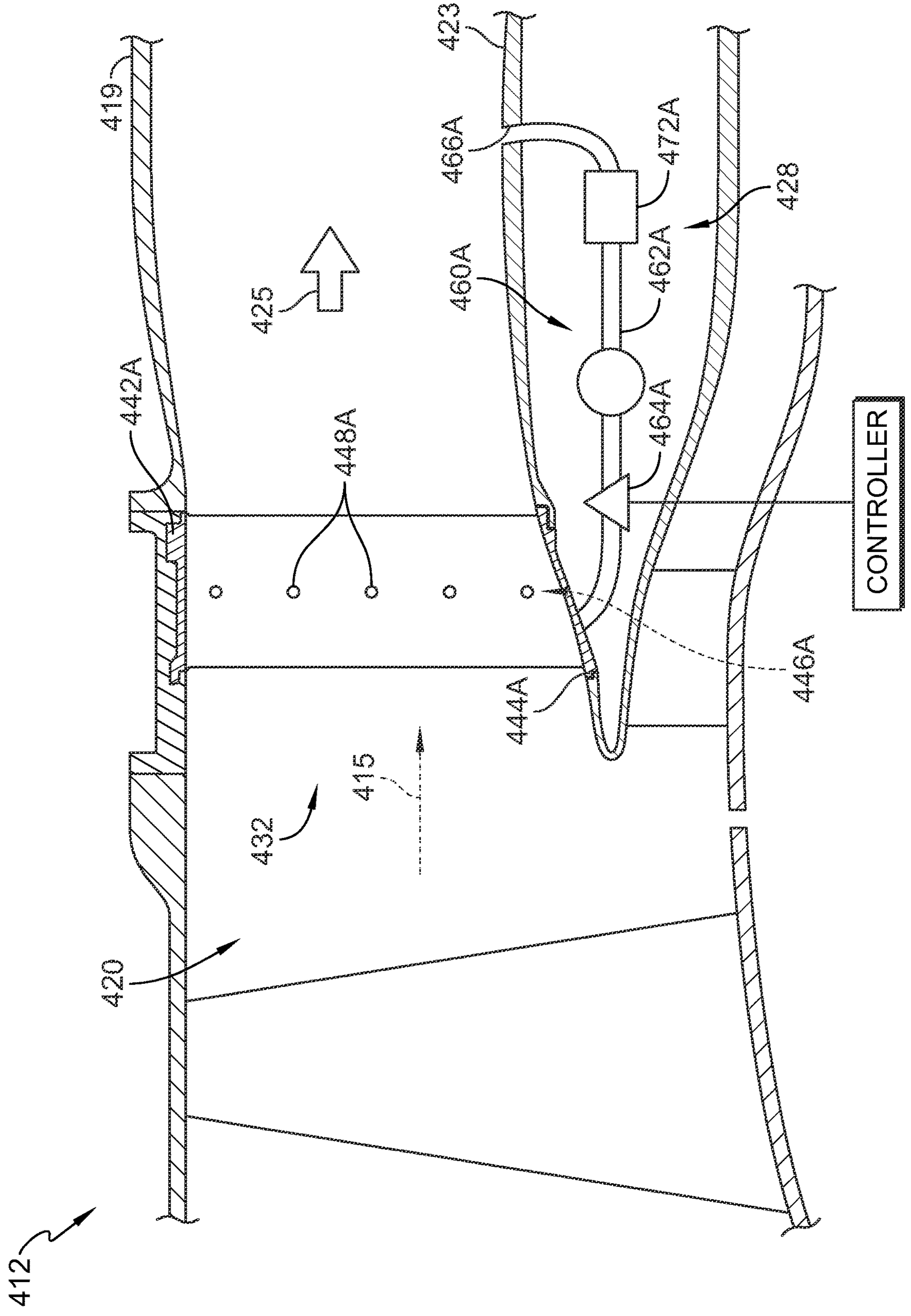
FIG. 9 is a diagrammatic cross-sectional view of another embodiment of a fan duct assembly for use in the gas turbine engine of FIG. 1, showing that a circumferentially variable flow control system is located radially inward of an inner wall of the bypass duct.

Another embodiment of a fan duct assembly 412 in accordance with the present disclosure is shown in FIG. 9. The fan duct assembly 412 is substantially similar to the fan duct assembly 12 shown in FIGS. 1-6 and described herein. Accordingly, similar reference numbers in the 400 series indicate features that are common between the fan duct assembly 12 and the fan duct assembly 412. The description of the fan duct assembly 12 is incorporated by reference to apply to the fan duct assembly 412, except in instances when it conflicts with the specific description and the drawings of the fan duct assembly 412.

As compared to the fan duct assembly 12, a circumferentially variable flow control system 428 of the fan duct assembly 412 is arranged radially inward of an outer wall 419 and an inner wall 423 of a bypass duct 420 as shown in FIG. 9. A first flow line 460A of the circumferentially variable flow control system 428 includes a first conduit 462A, a first valve 464A, and a pump 472A. The pump 472A is configured to operate in different modes to increase a pressure to enable sufficient flow of the portion of the bypass air 415, if necessary.

In a first mode, the pump 472A forces and/or pulls a portion of the bypass air 415 flowing through a gas path 425 into an inlet port 466A extending through the inner wall 23 of the bypass duct 20 as shown in FIG. 9. The portion of the bypass air 415 flows axially forward through the first conduit 462A toward a first plurality of vanes 432. The portion of the bypass air 415 flows into an injection passage 446A formed in each of the first plurality of vanes 432 and out of outlet holes 448A formed in each of the first plurality of vanes 432 to return to the gas path 425. The injection passage 446A extends radially into each of the first plurality of vanes 432 from a radial inner platform 444A toward a radial outer platform 442A. In a second mode, the pump 472A creates a vacuum to pull the portion of the bypass air 415 through the outlet holes 448A so that the portion of the bypass air 415 flows through the outlet holes 448A, radially inward through the injection passage 446A, and axially aft through the first conduit 462A to return to the gas path 425 through the inlet port 466A.

A method of operating a fan duct assembly 12 includes providing a bypass duct 20, 420 that extends circumferentially around the central axis 11. The bypass duct 20, 420 has the outer wall 19, 419 that defines a radially outer boundary of the gas path 25 and the inner wall 23, 423 that defines a radially inner boundary of the gas path 25. The method includes coupling the first vane 32, 432 of the outlet guide vane assembly 26 with the bypass duct 20, 420. The method includes coupling the second vane 34 of the outlet guide vane assembly 26 with the bypass duct 20, 420 circumferentially spaced apart from the first vane 32, 432.

The method includes flowing bypass air 15, 415 through the gas path 25, 425 of the bypass duct 20, 420. The method includes, in response to a first signal, opening the first valve 64A, 464A, closing the second valve 64B, and directing the portion of the bypass air 15, 415 flowing through the bypass duct 20, 420 into the first vane 32, 432 such that the portion of the bypass air 15, 415 is not directed toward the second vane 34. The method includes, in response to a second signal, opening the second valve 64B, closing the first valve 64A, 464A, and directing the portion of the bypass air 15, 415 into the second vane 34 such that the portion of the bypass air 15, 415 is not directed toward the first vane 32.

The method includes in response to the first signal, directing the portion of the bypass air 15 radially outward through the outer wall 19, directing the portion of the bypass air 15 axially forward through the first conduit 62A, 262A, and directing the portion of the bypass air 15 radially inward through the outlet port 68A into the first vane 32.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan duct assembly adapted for use with a gas turbine engine, the fan duct assembly comprising:

a bypass duct arranged circumferentially around a central axis, the bypass duct having an outer wall that defines a radially outer boundary of a gas path of bypass air conducted through the fan duct assembly and an inner wall that defines a radially inner boundary of the gas path, a fan comprising a plurality of fan blades that extend radially outward relative to the central axis and configured to rotate about the central axis to force the bypass air through the gas path, an outlet guide vane assembly coupled with the bypass duct axially downstream of the fan and having a plurality of vanes configured to adjust a direction of the bypass air received from the plurality of fan blades, the plurality of vanes including a first plurality of vanes that extend radially between the inner wall and the outer wall of the bypass duct and a second plurality of vanes circumferentially spaced apart from the first plurality of vanes and extending radially between the inner wall and the outer wall of the bypass duct, and a circumferentially variable flow control system configured to direct selectively a portion of the bypass air flowing through the gas path at a location aft of the plurality of vanes radially into each of the first plurality of vanes and each of the second plurality of vanes to minimize stall at the plurality of vanes, wherein, in a first mode, the circumferentially variable flow control system directs the portion of the bypass air into each of the first plurality of vanes without directing the portion of the bypass air into each of the second plurality of vanes and, in a second mode, the circumferentially variable flow control system directs the portion of the bypass air radially into each of the second plurality of vanes without directing the portion of the bypass air into each of the first plurality of vanes.

2. The fan duct assembly of claim 1, wherein each of the plurality of vanes is formed to include an injection passage extending radially therethrough and outlet holes in fluid communication with the injection passage and the gas path, the injection passage of each of the plurality of vanes receives the portion of the bypass air therein and the portion of the bypass air exits the injection passage through the outlet holes to return to the gas path.

3. The fan duct assembly of claim 1, wherein the circumferentially variable flow control system includes a controller that detects a pressure at each of the plurality of vanes and operates in the first mode or the second mode based on the pressure detected at each of the plurality of vanes.

4. The fan duct assembly of claim 1, wherein the circumferentially variable flow control system includes a first flow line that fluidly connects the gas path with each of the first plurality of vanes and a second flow line that fluidly connects the gas path with each of the second plurality of vanes.

5. The fan duct assembly of claim 4, wherein the first flow line includes a first conduit and a first valve, the first conduit having an inlet port in fluid communication with the gas path and a plurality of outlet ports each in fluid communication with a corresponding one of the first plurality of vanes, and the first valve is coupled with the first conduit and configured to selectively open and close to allow and block the portion of the bypass air through the first conduit to the first plurality of vanes.

6. The fan duct assembly of claim 5, wherein the second flow line includes a second conduit and a second valve, the second conduit having an inlet port in fluid communication with the gas path and a plurality of outlet ports each in fluid communication with a corresponding one of the second plurality of vanes, and the second valve is coupled with the second conduit and configured to selectively open and close to allow and block the portion of the bypass air through the second conduit to the second plurality of vanes.

7. The fan duct assembly of claim 5, wherein each of the first plurality of vanes is formed to include an injection passage extending radially therethrough and outlet holes in fluid communication with the injection passage and the gas path, the injection passage of each of the first plurality of vanes is fluidly connected with a corresponding one of the plurality of outlet ports such that the portion of the bypass air flows through the corresponding one of the plurality of outlet ports, into the injection passage, and out of the injection passage through the outlet holes to return to the gas path.

8. The fan duct assembly of claim 5, wherein the first flow line includes a pump coupled with the first conduit upstream of the plurality of outlet ports, the pump configured to force the portion of the bypass air through the first conduit toward the first plurality of vanes.

9. The fan duct assembly of claim 4, wherein the circumferentially variable flow control system includes a manifold fluidly connecting the first flow line and the second flow line.

10. The fan duct assembly of claim 1, wherein in a third mode, the circumferentially variable flow control system directs the portion of the bypass air into each of the first plurality of vanes and into each of the second plurality of vanes.

11. The fan duct assembly of claim 1, wherein at least one vane included in the second plurality of vanes is a structural support vane fixed with the outer wall and the inner wall of the bypass duct to transmit force loads from the first plurality of vanes to the bypass duct.

12. A fan duct assembly adapted for use with a gas turbine engine, the fan duct assembly comprising:

a bypass duct arranged circumferentially around a central axis, the bypass duct having an outer wall that defines a radially outer boundary of a gas path of bypass air conducted through the fan duct assembly and an inner wall that defines a radially inner boundary of the gas path, an outlet guide vane assembly coupled with the bypass duct and including a first vane that extends radially between the inner wall and the outer wall of the bypass duct and a second vane circumferentially spaced apart from the first vane and extending radially between the inner wall and the outer wall of the bypass duct, and a flow control system configured to direct selectively a portion of the bypass air flowing through the gas path into the first vane and the second vane, wherein, in a first mode, the flow control system directs the portion of the bypass air into the first vane without directing the portion of the bypass air into the second vane and, in a second mode, the flow control system directs the portion of the bypass air into the second vane without directing the portion of the bypass air into the first vane.

13. The fan duct assembly of claim 12, wherein the first vane and the second vane are each formed to include an injection passage extending radially therethrough and outlet holes in fluid communication with the injection passage and the gas path, the injection passage of each of the first vane and the second vane receives the portion of the bypass air therein and the portion of the bypass air exits the injection passage through the outlet holes to return to the gas path.

14. The fan duct assembly of claim 13, wherein the flow control system includes a first flow line that fluidly connects the gas path with the injection passage formed in the first vane and a second flow line that fluidly connects the gas path with injection passage formed in the second vane, and wherein the first flow line includes a first conduit and a first valve, the first conduit having a first port in fluid communication with the gas path and a second port in fluid communication with the first vane, and the first valve is coupled with the first conduit and configured to selectively open and close to allow and block the portion of the bypass air through the first conduit.

15. The fan duct assembly of claim 14, wherein the first conduit and the first valve are located radially outward of the outer wall such that the portion of the bypass air flowing through the first conduit is not exposed to an outer radial surface of the outer wall of the bypass duct.

16. The fan duct assembly of claim 14, wherein the first conduit and the first valve are located radially inward of the inner wall of the bypass duct.

17. The fan duct assembly of claim 14, wherein the first flow line includes a pump coupled with the first conduit and configured to force the portion of the bypass air axially forward through the first conduit toward the first vane.

18. The fan duct assembly of claim 14, wherein the first flow line includes a pump coupled with the first conduit and configured to pull the portion of the bypass air through outlet holes formed in the first vane so that the portion of the bypass air flows axially aft through the first conduit.

19. A method comprising:

providing a bypass duct that extends circumferentially around a central axis, the bypass duct having an outer wall that defines a radially outer boundary of a gas path and an inner wall that defines a radially inner boundary of the gas path, coupling a first vane of an outlet guide vane assembly with the bypass duct, coupling a second vane of the outlet guide vane assembly with the bypass duct circumferentially spaced apart from the first vane, flowing bypass air through the gas path of the bypass duct, in response to a first signal, opening a first valve, closing a second valve, and directing a portion of the bypass air flowing through the bypass duct into the first vane such that the portion of the bypass air is not directed toward the second vane, and in response to a second signal, opening the second valve, closing the first valve, and directing the portion of the bypass air into the second vane such that the portion of the bypass air is not directed toward the first vane.

20. The method of claim 19, further comprising, in response to the first signal, directing the portion of the bypass air radially outward through the outer wall of the bypass duct, directing the portion of the bypass air axially forward through a first conduit, and directing the portion of the bypass air radially inward through an outlet port into the first vane.

* * * * *